(12) United States Patent
Hecht et al.

(10) Patent No.: US 9,120,154 B2
(45) Date of Patent: Sep. 1, 2015

(54) SINGLE-SIDED SQUARE-SHAPED INDEXABLE CUTTING INSERT AND CUTTING TOOL

(71) Applicant: Iscar, Ltd., Tefen (IL)

(72) Inventors: Gil Hecht, Nahariya (IL); Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 219 days.

(21) Appl. No.: 13/767,626

(22) Filed: Feb. 14, 2013

(65) Prior Publication Data
US 2014/0227051 A1    Aug. 14, 2014

(51) Int. Cl.
*B23B 27/16*    (2006.01)
*B23B 29/06*    (2006.01)

(52) U.S. Cl.
CPC ............ *B23B 27/1622* (2013.01); *B23B 29/06* (2013.01); *B23B 2200/0471* (2013.01); *B23B 2200/161* (2013.01); *B23B 2205/12* (2013.01); *Y10T 407/22* (2015.01); *Y10T 407/2274* (2015.01); *Y10T 407/23* (2015.01)

(58) Field of Classification Search
USPC ............. 407/48, 66, 102, 101, 113, 108, 114, 407/107, 103
See application file for complete search history.

(56) References Cited

U.S. PATENT DOCUMENTS

| | | | | |
|---|---|---|---|---|
| 1,629,667 | A | * | 5/1927 | Knipple .......................... 407/103 |
| 2,382,510 | A | * | 8/1945 | Donaldson ..................... 408/186 |
| 2,887,760 | A | * | 5/1959 | Armstrong ........................ 407/6 |
| 3,050,828 | A | * | 8/1962 | Cashman et al. ................ 407/77 |
| 3,066,385 | A | * | 12/1962 | Vana .............................. 407/110 |
| 3,121,939 | A | * | 2/1964 | Williams ....................... 407/103 |
| 3,132,542 | A | * | 5/1964 | Horvath ......................... 408/197 |
| 3,376,763 | A | * | 4/1968 | Welles ........................... 408/199 |
| 3,405,433 | A | * | 10/1968 | Williams ......................... 407/40 |
| 3,484,920 | A | * | 12/1969 | Werner .............................. 407/6 |
| 3,623,201 | A | * | 11/1971 | Gustafson ..................... 407/104 |
| 3,629,919 | A | * | 12/1971 | Trevarrow, Jr. ............... 407/103 |
| 4,035,890 | A | * | 7/1977 | Eriksson et al. .............. 407/104 |

(Continued)

FOREIGN PATENT DOCUMENTS

DE        3446455 A1    6/1986
WO    WO 2013/065711 A1    5/2013

OTHER PUBLICATIONS

International Search Report dated May 22, 2014 issued in PCT counterpart application (No. PCT/IL2014/050095).

*Primary Examiner* — Sunil K Singh
*Assistant Examiner* — Sara Addisu
(74) *Attorney, Agent, or Firm* — Womble Carlyle (57) ABSTRACT

A single-sided, square-shaped indexable cutting insert has opposing square-shaped upper and lower surfaces and a peripheral side surface extending therebetween having four corner surfaces alternating with four relief surfaces. A corner cutting edge is formed at the intersection of the upper surface with each of the four corner surfaces. The lower surface includes a base surface from which a central boss and exactly four engagement ridges protrude. Each engagement ridge extends from the central boss to intersect with one of the four corner surfaces, and the base surface is divided into four base sub-surfaces. The insert may be clamped against a seating surface of a tool holder pocket solely by the engagement ridge located closest to the operative corner cutting edge making contact with a corresponding single engagement groove, and the two of the four base sub-surfaces making contact with two coplanar raised support surfaces.

25 Claims, 6 Drawing Sheets

(56) References Cited

U.S. PATENT DOCUMENTS

| | | | | |
|---|---|---|---|---|
| 4,209,047 A * | 6/1980 | Weill | | 144/208.8 |
| 4,315,706 A * | 2/1982 | Erkfritz | | 407/101 |
| 4,437,802 A * | 3/1984 | Hall, Jr. | | 408/197 |
| 4,470,732 A * | 9/1984 | Lindsay | | 407/104 |
| 4,533,283 A * | 8/1985 | Satran et al. | | 407/111 |
| 4,714,384 A * | 12/1987 | Lagerberg | | 407/103 |
| 4,848,199 A * | 7/1989 | Kelm | | 82/159 |
| 5,028,175 A * | 7/1991 | Pawlik | | 407/40 |
| 5,076,738 A * | 12/1991 | Pano et al. | | 407/110 |
| 5,163,788 A * | 11/1992 | Dahl et al. | | 407/46 |
| D331,931 S * | 12/1992 | Eriksson | | D15/28 |
| 5,230,591 A * | 7/1993 | Katbi et al. | | 407/114 |
| 5,275,633 A * | 1/1994 | Johansson et al. | | 51/309 |
| 5,469,902 A * | 11/1995 | Sharp et al. | | 144/241 |
| 5,477,754 A * | 12/1995 | Herbon | | 76/101.1 |
| 5,542,795 A * | 8/1996 | Mitchell | | 407/35 |
| 5,634,745 A * | 6/1997 | Wiman et al. | | 407/113 |
| 5,682,803 A * | 11/1997 | Boianjiu | | 82/1.11 |
| 5,702,210 A * | 12/1997 | Boianjiu | | 407/100 |
| 5,810,518 A * | 9/1998 | Wiman et al. | | 407/102 |
| 5,924,826 A * | 7/1999 | Bystrom et al. | | 407/103 |
| 5,947,660 A * | 9/1999 | Karlsson et al. | | 408/230 |
| 6,010,281 A * | 1/2000 | Coutat et al. | | 407/110 |
| 6,074,137 A * | 6/2000 | Betman et al. | | 407/103 |
| 6,086,290 A * | 7/2000 | Qvarth et al. | | 407/38 |
| 6,086,291 A * | 7/2000 | Hansson et al. | | 407/110 |
| 6,146,061 A * | 11/2000 | Larsson | | 407/103 |
| 6,158,928 A * | 12/2000 | Hecht | | 407/102 |
| 6,168,357 B1 * | 1/2001 | Coutat et al. | | 407/110 |
| 6,183,688 B1 * | 2/2001 | Karlsson et al. | | 419/18 |
| 6,186,705 B1 * | 2/2001 | Kumar et al. | | 407/114 |
| 6,220,794 B1 * | 4/2001 | Calamia et al. | | 407/40 |
| 6,244,790 B1 * | 6/2001 | Kingdom et al. | | 407/110 |
| 6,280,122 B1 * | 8/2001 | Qvarth | | 407/36 |
| 6,343,898 B1 * | 2/2002 | Sjoo et al. | | 407/101 |
| 6,481,936 B1 * | 11/2002 | Hecht | | 407/111 |
| 6,543,970 B1 * | 4/2003 | Qvarth et al. | | 407/114 |
| 6,591,878 B2 * | 7/2003 | Hinchliff | | 144/241 |
| 6,599,060 B2 * | 7/2003 | Hecht | | 407/102 |
| 6,601,486 B2 * | 8/2003 | Hansson et al. | | 82/161 |
| 6,623,216 B2 * | 9/2003 | Hansson | | 407/83 |
| 6,626,614 B2 * | 9/2003 | Nakamura | | 408/59 |
| 6,715,967 B2 * | 4/2004 | Wiman et al. | | 407/114 |
| 6,736,574 B2 * | 5/2004 | Persson et al. | | 407/77 |
| 6,769,843 B2 * | 8/2004 | Hansson | | 407/91 |
| 6,834,692 B2 * | 12/2004 | Lindsay et al. | | 144/241 |
| 6,840,716 B2 * | 1/2005 | Morgulis et al. | | 407/34 |
| 6,884,008 B2 * | 4/2005 | Minshall | | 407/113 |
| 6,921,234 B2 * | 7/2005 | Arvidsson et al. | | 407/103 |
| 6,926,472 B2 * | 8/2005 | Arvidsson | | 407/92 |
| 6,929,427 B2 * | 8/2005 | Satran | | 407/42 |
| 6,929,428 B1 * | 8/2005 | Wermeister et al. | | 407/113 |
| 6,948,889 B2 * | 9/2005 | Arvidsson | | 407/35 |
| 7,001,114 B2 * | 2/2006 | Blucher et al. | | 407/103 |
| 7,037,051 B2 * | 5/2006 | Wermeister | | 407/113 |
| 7,121,771 B2 * | 10/2006 | Englund | | 407/103 |
| 7,163,360 B2 * | 1/2007 | Toyose | | 407/36 |
| 7,179,021 B2 * | 2/2007 | Shaheen | | 407/107 |
| 7,201,545 B2 * | 4/2007 | Ejderklint | | 409/131 |
| 7,217,070 B2 * | 5/2007 | Hecht | | 408/154 |
| 7,325,471 B2 * | 2/2008 | Massa et al. | | 82/1.11 |
| 7,387,474 B2 * | 6/2008 | Edler et al. | | 407/113 |
| 7,410,332 B2 * | 8/2008 | Scherbarth | | 407/113 |
| 7,422,395 B2 * | 9/2008 | Huang | | 407/107 |
| 7,488,142 B2 * | 2/2009 | Englund et al. | | 407/107 |
| 7,490,533 B2 * | 2/2009 | Dehn et al. | | 76/101.1 |
| 7,510,354 B2 * | 3/2009 | Andersson et al. | | 407/113 |
| 7,537,419 B2 * | 5/2009 | Sjoberg et al. | | 407/103 |
| 7,578,639 B2 * | 8/2009 | Wiman et al. | | 407/101 |
| 7,578,641 B2 * | 8/2009 | Andersson et al. | | 407/113 |
| 7,607,867 B2 * | 10/2009 | Benson | | 407/102 |
| 7,637,701 B2 * | 12/2009 | Pantzar | | 407/113 |
| 7,641,423 B2 * | 1/2010 | Blucher et al. | | 407/66 |
| 7,645,100 B2 * | 1/2010 | Andersson et al. | | 407/66 |
| 7,670,088 B2 * | 3/2010 | Andersson et al. | | 407/33 |
| 7,682,109 B2 * | 3/2010 | Hecht et al. | | 407/102 |
| RE41,275 E * | 4/2010 | Tsuda et al. | | 407/107 |
| 7,819,610 B2 * | 10/2010 | Wallstrom et al. | | 407/113 |
| 7,845,256 B2 * | 12/2010 | Pantzar | | 82/1.11 |
| 8,192,114 B2 * | 6/2012 | Chang | | 408/224 |
| 8,313,270 B2 * | 11/2012 | Hecht | | 407/113 |
| 8,403,603 B2 * | 3/2013 | Zitzlaff et al. | | 407/107 |
| 8,454,277 B2 * | 6/2013 | Dudzinsky et al. | | 407/67 |
| 8,459,907 B2 * | 6/2013 | Mergenthaler | | 408/231 |
| 8,475,089 B2 * | 7/2013 | Kakai | | 407/113 |
| 8,511,943 B2 * | 8/2013 | Gustavsson | | 407/42 |
| 8,529,167 B2 * | 9/2013 | Shaheen | | 407/113 |
| 8,573,903 B2 * | 11/2013 | Morrison et al. | | 407/113 |
| 8,573,905 B2 * | 11/2013 | Hecht | | 407/113 |
| 8,596,933 B2 * | 12/2013 | Ryu | | 407/42 |
| 8,657,539 B2 * | 2/2014 | Morrison et al. | | 407/113 |
| 8,678,718 B2 * | 3/2014 | Hecht | | 407/117 |
| 8,714,886 B2 * | 5/2014 | Hecht et al. | | 407/113 |
| 8,753,045 B2 * | 6/2014 | Hecht | | 407/40 |
| D709,110 S * | 7/2014 | Morrison et al. | | D15/139 |
| 8,821,079 B2 * | 9/2014 | Hecht | | 407/113 |
| 8,845,243 B2 * | 9/2014 | Hansson | | 408/188 |
| 8,858,130 B2 * | 10/2014 | Morrison et al. | | 407/113 |
| 2002/0119017 A1 * | 8/2002 | Gates et al. | | 407/100 |
| 2003/0077129 A1 * | 4/2003 | Cirino | | 407/53 |
| 2006/0056926 A1 | 3/2006 | Riviere et al. | | |
| 2006/0056928 A1 * | 3/2006 | Riviere et al. | | 407/113 |
| 2006/0140732 A1 * | 6/2006 | Hecht et al. | | 408/199 |
| 2007/0122242 A1 | 5/2007 | Englund et al. | | |
| 2007/0160431 A1 | 7/2007 | Pantzar | | |
| 2008/0181731 A1 | 7/2008 | Wallstrom et al. | | |
| 2012/0315102 A1 * | 12/2012 | Hecht | | 408/227 |
| 2013/0101364 A1 * | 4/2013 | Dufour et al. | | 407/67 |
| 2013/0156516 A1 * | 6/2013 | Hecht | | 407/103 |
| 2013/0236255 A1 | 9/2013 | Hecht | | |
| 2013/0294850 A1 * | 11/2013 | Park | | 407/47 |
| 2013/0330136 A1 * | 12/2013 | Hecht | | 407/113 |
| 2014/0186130 A1 * | 7/2014 | Hecht | | 407/100 |
| 2014/0227051 A1 * | 8/2014 | Hecht et al. | | 407/103 |
| 2014/0234037 A1 * | 8/2014 | Horiike et al. | | 407/47 |
| 2014/0294525 A1 * | 10/2014 | Hecht | | 407/103 |
| 2015/0016900 A1 * | 1/2015 | Jansson | | 407/33 |

\* cited by examiner

SINGLE-SIDED SQUARE-SHAPED INDEXABLE CUTTING INSERT AND CUTTING TOOL

FIELD OF THE INVENTION

The present invention relates to a cutting tool and a square-shaped cutting insert for use in metal cutting processes in general, and for turning operations in particular.

BACKGROUND OF THE INVENTION

Within the field of cutting tools used in turning operations, there are many examples of cutting inserts being removably secured in an insert receiving pocket of a tool holder. In some instances, these cutting tools are configured such that the co-operating surfaces of the cutting insert and the insert receiving pocket are formed with protrusions and recesses. In other instances, these cutting tools are configured such that the co-operating surfaces of the cutting insert and the insert receiving pocket are formed with male and female type mating elements.

U.S. Pat. No. 7,201,545 discloses a cutting tool having a holder, a shim and an indexable cutting insert. The shim, having a polygonal shape with substantially parallel upper and lower sides, is mounted in a pocket of the holder. In an alternative embodiment of the invention, the cutting insert, having a square basic shape, in analogy with the shim, can be mounted against the shim in four index positions, whereby three out of eight protrusions on a lower side of the cutting insert are in 'active' abutment with two support surfaces on the upper side of the shim, whilst two recesses on the upper side of the shim provide clearance for the other five 'passive' protrusions.

U.S. Pat. No. 7,387,474 discloses a cutting tool having a holder with an insert seat, and an indexable cutting insert, with a rhombic basic shape, mounted therein. The insert seat includes two male type engagement portions in the form of elongated ridges oriented at a 90° to each other, and forming a T-shaped configuration. A bottom side of the cutting insert includes two sets of female type engagement portions, each set having two elongated grooves oriented at 90° to each other. In both index positions of the cutting insert, one set is actively engaged with the two elongated ridges and the other set is inactive.

SUMMARY OF THE INVENTION

In accordance with the present invention, there is provided a single-sided indexable cutting insert comprising:

opposing square-shaped upper and lower surfaces and a peripheral side surface extending therebetween, the peripheral side surface having four corner surfaces alternating with four relief surfaces;

a central axis passing through the upper and lower surfaces, about which central axis the cutting insert is indexable; and a corner cutting edge formed at the intersection of the upper surface with each of the four corner surfaces, the lower surface comprising:

a base surface; and exactly four engagement ridges protruding from the base surface, each engagement ridge intersecting one of the four corner surfaces and extending therefrom towards the central axis to thereby divide the base surface into at least four base sub-surfaces, each engagement ridge including a pair of parallelly extending ridge flank surfaces forming a V-shaped cross-section.

Also in accordance with the present invention, there is provided a cutting tool comprising:

a tool holder having a main body with an insert receiving pocket formed in a front end thereof, and a cutting insert of the sort described above removably secured in the insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to a cutting tool 20 comprising a tool holder 22 having a main body 24 with an insert receiving pocket 26 formed in a front end 28 thereof, and a single-sided indexable cutting insert 30 removably secured in the insert receiving pocket 26.

Figure 1:
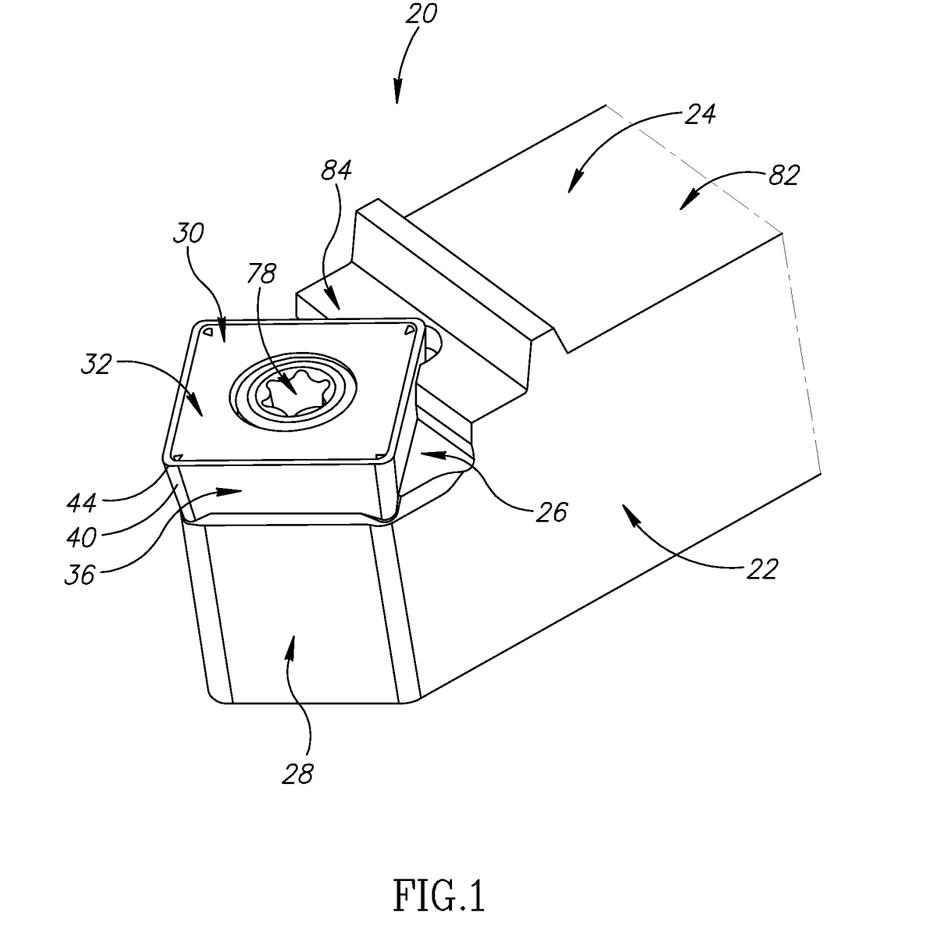
FIG. 1 is a perspective view of a cutting tool in accordance with some embodiments of the present invention.
Figure 2:
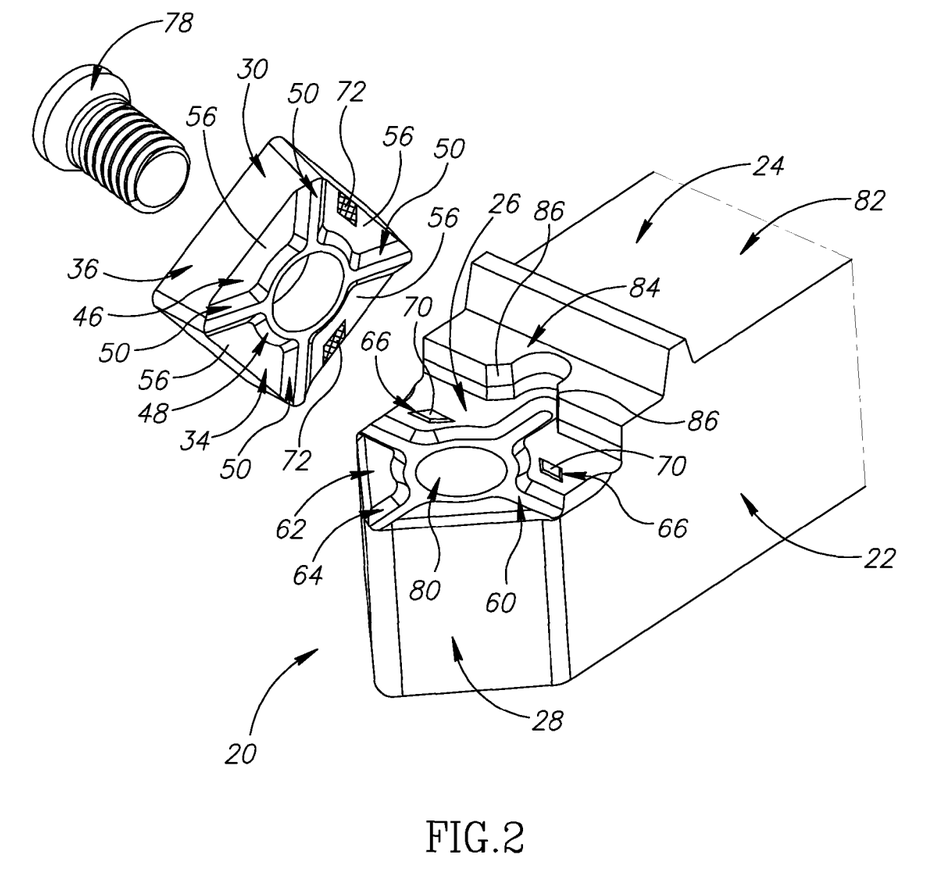
FIG. 2 is an exploded perspective view of the cutting tool shown in FIG. 1.

In some embodiments of the present invention, as shown in FIGS. 1 and 2, the cutting tool 20 may be in the form of a turning tool, having a holder shank 82 extending away from the front end 28 of the main body 24.

Also, in some embodiments of the present invention, the tool holder 22 may be manufactured from machined steel, and the cutting insert 30 may preferably be manufactured by form pressing and sintering a cemented carbide, such as tungsten carbide, and may be coated or uncoated.

Figure 3:
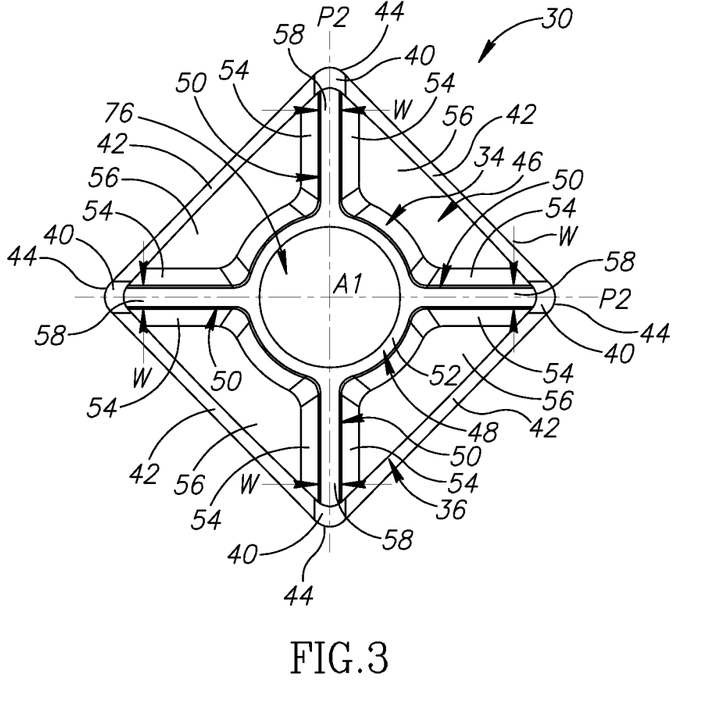
FIG. 3 is a bottom view of a cutting insert in accordance with some embodiments of the present invention.
Figure 4:
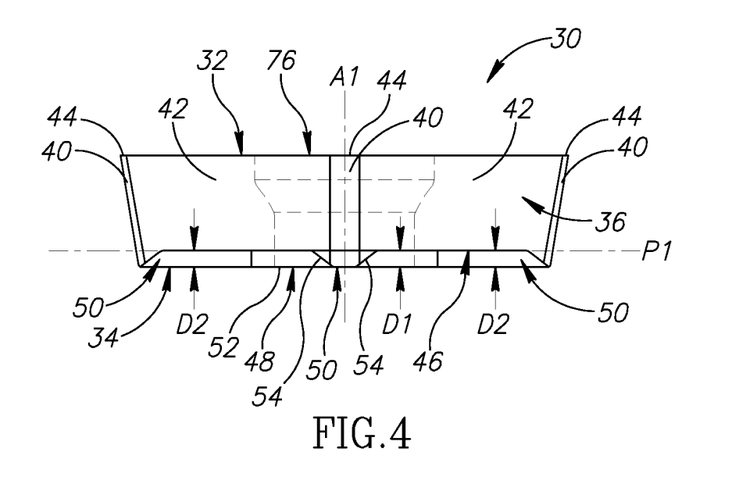
FIG. 4 is a side view of the cutting insert shown in FIG. 3.

According to the present invention, as shown in FIGS. 3 and 4, the cutting insert 30 has opposing square-shaped upper and lower surfaces 32, 34 and a peripheral side surface 36 extending therebetween, the peripheral side surface 36 having four corner surfaces 40 alternating with four side surfaces 42 which constitute relief surfaces 42. The four side surfaces 42 have the same length and adjacent pairs of the four side surfaces 42 form 90° angles with each other.

A corner cutting edge 44 is formed at the intersection of the upper surface 32 with each of the four corner surfaces 40.

In some embodiments of the present invention, the four corner surfaces 40 may be identical, and the four corner cutting edges 44 may be identical.

Also, in some embodiments of the present invention, each corner cutting edge 44 may have a substantially constant radius, subtending a corner angle of 90°.

Further, in some embodiments of the present invention, the cutting insert 30 may be described as 'positive', with the four relief surfaces 42 inclined inwardly in a direction away from the upper surface 32.

Yet further, in some embodiments of the present invention, the four relief surfaces 42 may be planar.

According to the present invention, as shown in FIGS. 3 and 4, the lower surface 34 includes a base surface 46, a central axis A1 passes through the upper and lower surfaces 32, 34, and the cutting insert 30 is indexable about the central axis A1.

In some embodiments of the present invention, as shown in FIG. 4, the base surface 46 may define a base plane P, and the central axis A1 may be perpendicular to the base plane P1.

Also, in some embodiments of the present invention, as shown in FIG. 3, the cutting insert 30 may exhibit four-fold rotational symmetry about the central axis A1.

Further, in some embodiments of the present invention, as shown in FIG. 3, the cutting insert 30 may exhibit minor symmetry about a vertical insert plane P2 containing the central axis A1 and bisecting two diagonally opposed corner cutting edges 44.

According to the present invention, as shown in FIGS. 3 and 4, exactly four engagement ridges 50 protrude from the base surface 46, each engagement ridge 50 including a pair of parallelly extending ridge flank surfaces 54 forming a V-shaped cross-section.

Figure 8:
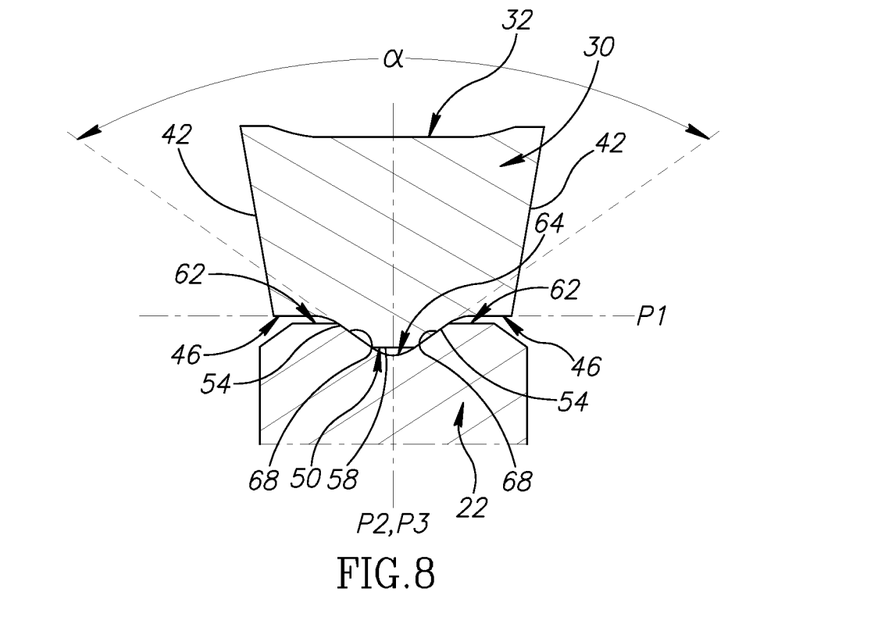
FIG. 8 is a cut view of the cutting tool shown in FIG. 7 taken along the line VIII-VIII.

In some embodiments of the present invention, as shown in FIG. 8, the pair of ridge flank surfaces 54 of each engagement ridge 50 may form an obtuse engagement angle $\alpha$. The engagement angle $\alpha$ has a preferable range of 90°-150°.

In other embodiments of the present invention (not shown), the two surface components of the pair of ridge flank surfaces 54 of each engagement ridge 50 may be outwardly convex.

According to the present invention, as shown in FIG. 3, each engagement ridge 50 intersects one of the four corner surfaces 40 and extends therefrom towards the central axis A1, thereby dividing the base surface 46 into at least four separate base sub-surfaces 56.

In some embodiments of the present invention, as shown in FIGS. 3 and 4, each pair of ridge flank surfaces 54 may intersect its respective corner surface 40, thus providing good support for its associated corner cutting edge 44 when operative.

Also, in some embodiments of the present invention, as shown in FIGS. 3 and 4, a central boss 48 may protrude from the base surface 46, the central boss 48 may have a raised boss end surface 52, and each engagement ridge 50 may intersect the central boss 48, thereby separating the base sub-surfaces 56 from one another such that they do not communicate with each other.

It should be appreciated that the four engagement ridges 50 merge with the central boss 48 to form a single structural member, which improves the rigidity of the cutting insert 30 such that deformations and inaccuracies resulting from the sintering process of the cutting insert 30 are reduced to a minimum.

In some embodiments of the present invention, as shown in FIG. 3, the base surface 46 may have exactly four identical base sub-surfaces 56.

Also, in some embodiments of the present invention, in a bottom view of the cutting insert 30, as shown in FIG. 3, the central boss 48 may have a substantially circular shape.

Further, in some embodiments of the present invention, as shown in FIG. 4, the central boss 48 may protrude a first distance D1 from the base plane P1 and the four engagement ridges 50 may each protrude a second distance D2 from the base plane P1, where D1 is equal to D2.

It should be appreciated that use of the term "V-shaped" throughout the description and claims, is not restricted to a pair of flank surfaces forming a 'V' shape and intersecting at a vertex point (when viewed in cross-section), but also accounts for an additional surface spacing apart the pair of flank surfaces.

In some embodiments of the present invention, as shown in FIGS. 3 and 4, each engagement ridge 50 may include an intermediate surface 58 spacing apart its respective pair of ridge flank surfaces 54, and the boss end surface 52 of the central boss 48 and the two intermediate surfaces 58 may be coplanar and continuous. Thus, the term "V-shaped" applies to each engagement ridge 50 having such an intermediate surface 58 spacing apart its respective pair of ridge flank surfaces 54.

Further, in some embodiments of the present invention, as shown in FIG. 3, each intermediate surface 58 may have an intermediate width W, where W is greater than half of D2 and less than D2, i.e., $0.5D2 < W < D2$.

It should be appreciated that the intermediate width W being greater than half the second distance D2 provides each engagement ridge 50 with an advantageously compact and robust profile.

It should also be appreciated that the intermediate width W being less than the second distance D2 causes each pair of ridge flank surfaces 54 to extend to within close proximity of its respective corner surface 40, thus providing good support for its associated corner cutting edge 44 when operative.

Figure 5:
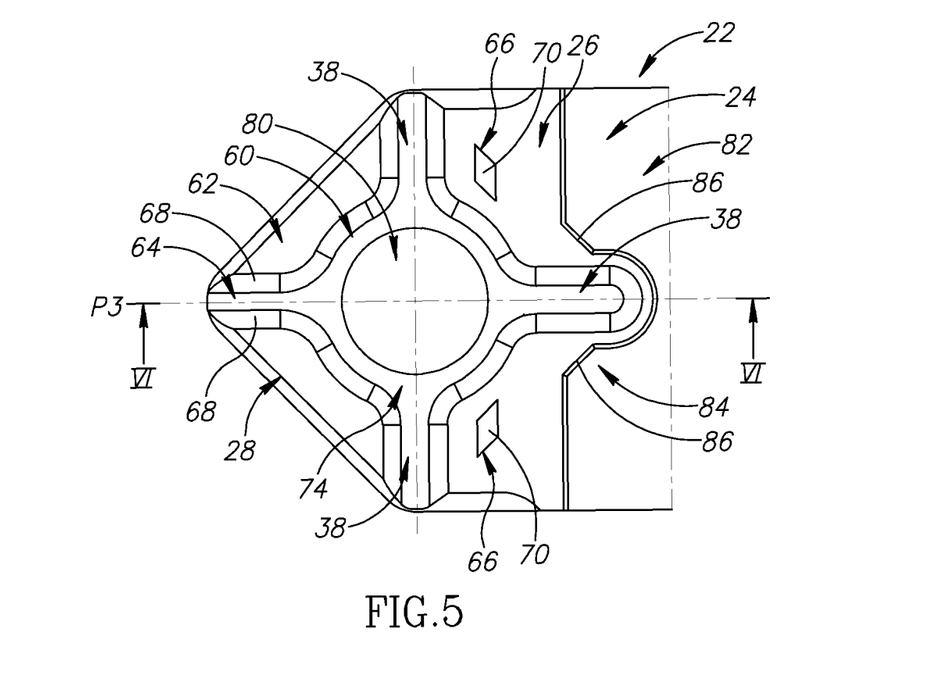
FIG. 5 is a top view of a tool holder in accordance with some embodiments of the present invention.
Figure 6:
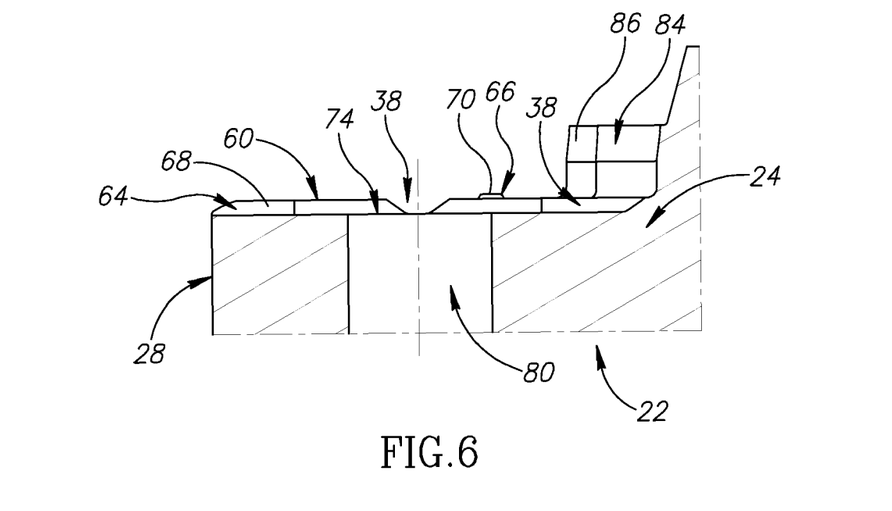
FIG. 6 is a cross-sectional view of the tool holder shown in FIG. 5, taken along the line VI-VI.

According to the present invention, as shown in FIGS. 5 and 6, the insert receiving pocket 26 includes a seating surface 60, the seating surface 60 having a floor surface 62 with a single engagement groove 64 recessed therein and two separate support pads 66 protruding therefrom.

The engagement groove 64 includes a pair of parallelly extending groove flank surfaces 68 forming a V-shaped cross-section, and each of the two support pads 66 has a raised support surface 70.

As shown in FIG. 8, the V-shaped cross-section of the pair of groove flank surfaces 68 corresponds with the V-shaped cross-section of the ridge flank surfaces 54 of the engagement ridge 50 located closest to the operative corner cutting edge 44. However, the intermediate surface 58 of the engagement ridge 50 located closest to the operative corner cutting edge 44 does not abut any surface of the engagement groove 64.

The two support surfaces 70 are coplanar and entirely located rearward of the engagement groove 64.

It should be appreciated that use of the term "rearward" and "rearwardly" throughout the description and claims, refers to a direction from the tool holder's front end 28 towards the tool holder's main body 24. This direction is towards the right, in FIGS. 5 and 7.

It should also be appreciated that the seating surface 60 being configured with the single engagement groove 64 and the two coplanar support surfaces 70, as opposed to an alternative configuration with more than one engagement groove or ridge, enables the insert receiving pocket 26 to be manufactured with greater efficiency.

In some embodiments of the present invention, as shown in FIG. 5, a pocket bisector plane P3 may longitudinally bisect the engagement groove 64, and the seating surface 60 may exhibit minor symmetry about the pocket bisector plane P3.

Also, in some embodiments of the present invention, as shown in FIG. 5, the pair of groove flank surfaces 68 may be entirely located closer to the pocket bisector plane P3 than are the two support surfaces 70.

According to the present invention, as shown in FIGS. 7 to 10, the lower surface 34 of the cutting insert 30 is clamped against the seating surface 60 of the insert receiving pocket 26 solely by:

the pair of ridge flank surfaces 54 of the engagement ridge 50 located closest to the operative corner cutting edge 44 making contact with the pair of groove flank surfaces 68 in the single engagement groove 64; and the base surface 46 making contact with the two raised support surfaces 70 at two bearing zones 72 entirely located further from the operative corner cutting edge 44 than the central axis A1.

In some embodiments of the present invention, the lower surface 34 of the cutting insert 30 may be clamped against the seating surface 60 of the insert receiving pocket 26 in one of four index positions.

Also, in some embodiments of the present invention, as shown in FIG. 2, the two bearing zones 72 may be located on two base sub-surfaces 56.

Further, in some embodiments of the present invention, as shown in FIGS. 5 and 6, the floor surface 62 may include a central recess 74 and three clearance grooves 38 extending therefrom.

Figure 9:
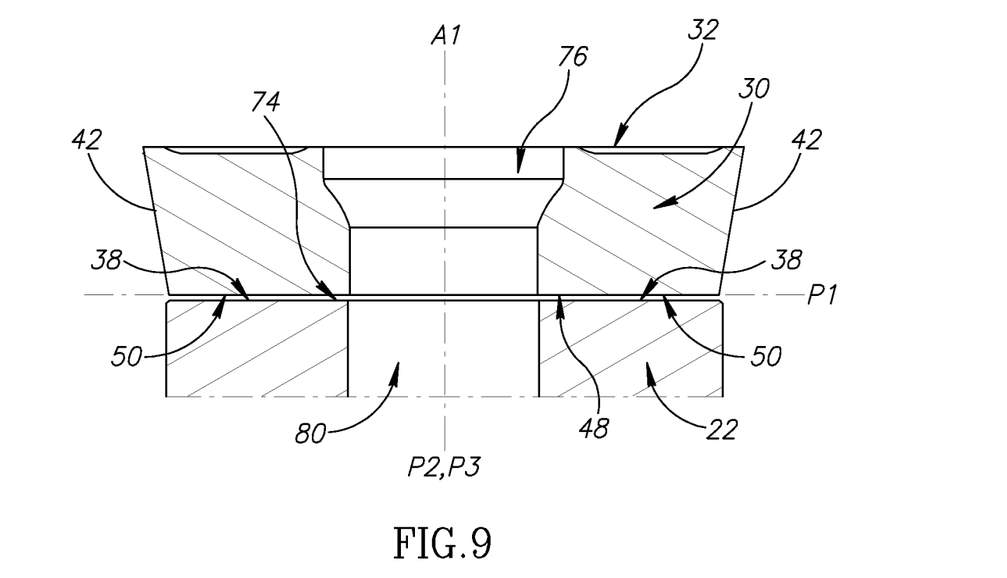
FIG. 9 is a cut view of the cutting tool shown in FIG. 7 taken along the line IX-IX.
Figure 10:
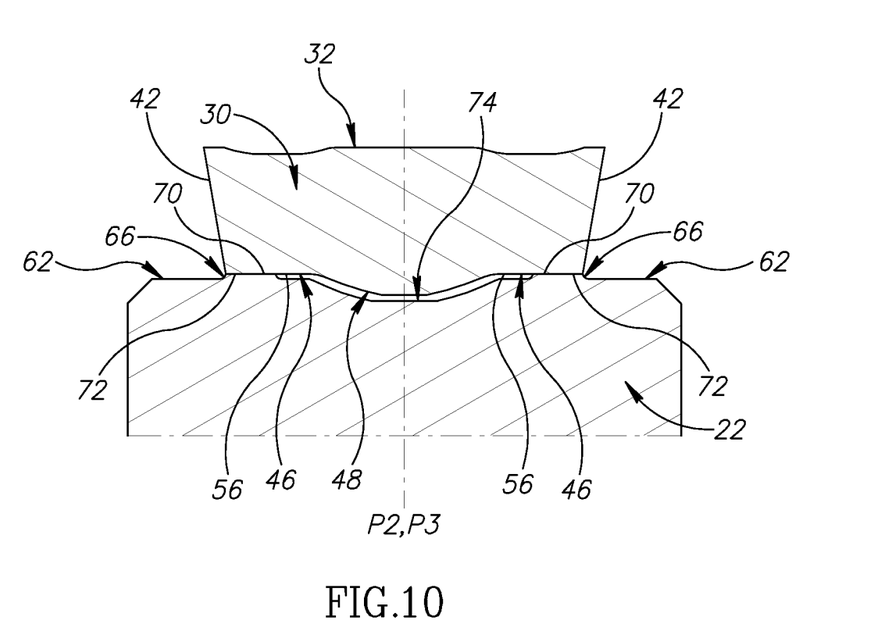
FIG. 10 is a cut view of the cutting tool shown in FIG. 7 taken along the line X-X.

As shown in FIGS. 9 and 10, the central recess 74 may provide clearance between the central boss 48 and the insert receiving pocket 26, and the three clearance grooves 38 may provide clearance between the non-operative engagement ridges 50 and the insert receiving pocket 26.

Also, in some embodiments of the present invention, as shown in FIGS. 2 and 10, each of the two bearing zones 72 of the cutting insert 30 may be delimited by a different one of the two relief surfaces 42 located furthest from the operative corner cutting edge 44.

It should be appreciated that the lower surface 34 of the cutting insert 30 is effectively clamped against the seating surface 60 of the insert receiving pocket 26 at three corner points of an imaginary triangle, where the central axis A1 intersects the imaginary triangle at a substantially central location to define an optimal point through which a clamping force can be applied, to achieve a high level of clamping stability. In some embodiments, the imaginary triangle is an isosceles triangle with the raised support surfaces 72 being symmetrically arranged about the pocket bisector plane P3 and equidistant from where the groove flank surfaces 68 support the ridge flank surfaces 54 of the cutting insert 30. In some embodiments, the imaginary triangle may even be an equilateral triangle.

Also, by virtue of the ridge flank surfaces 54 associated with the four engagement ridges 50 and the groove flank surfaces 68 associated with the single engagement groove 64 having V-shaped cross-sections, the cutting insert 30 has a high level of resistance to transverse cutting forces in each index position.

In some embodiments of the present invention, as shown in FIGS. 3 and 4, a through bore 76 may extend coaxially with the central axis A1 and open out to both the upper surface 32 and the boss end surface 52 of the cutting insert 30.

Also, in some embodiments of the present invention, as shown in FIGS. 1 and 2, a clamping screw 78 may be located in the through bore 76 and threadingly engaged in a threaded bore 80 in the seating surface 60 to apply the clamping force.

In other embodiments of the present invention (not shown), the through bore 76 may only open out to the upper surface 32, and an alternative clamping member may engage the through bore 76 to apply the clamping force.

It should be appreciated that in addition to the benefits already described above, the improved rigidity of the cutting insert 30 provided by the single structural member, also advantageously reduces the susceptibility of the cutting insert 30 to fracture or deformation during clamping and cutting operations.

In some embodiments of the present invention, as shown in FIGS. 5 and 6, the insert receiving pocket 26 may include an abutment shoulder 84 rearward of the seating surface 60 having exactly two abutment walls 86 entirely located further from the engagement groove 64 than the two support surfaces 70. As shown in FIG. 5, in a top view of the tool holder 22, the two abutment walls 86 may diverge in a forward direction.

It should be appreciated that use of the term "forward" throughout the description and claims, refers to a direction opposite to the rearward direction. The forward direction is towards the left, in FIGS. 5 and 7.

Also, in some embodiments of the present invention, the through bore 76 and the threaded bore 80 may be eccentric to each other, such that a component of the clamping force can be directed rearwardly.

Figure 7:
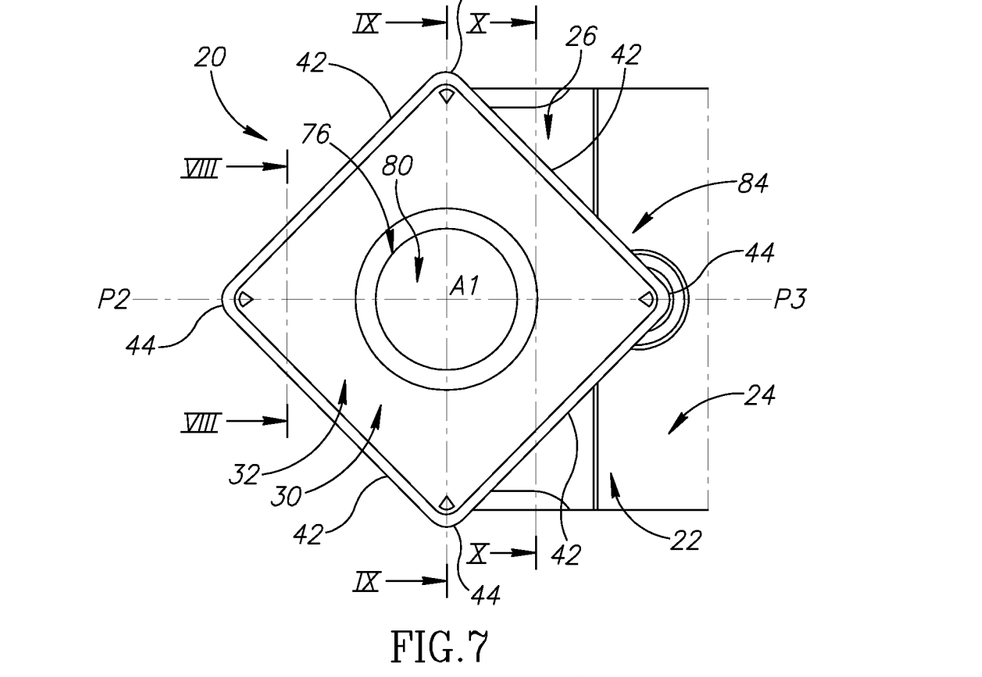
FIG. 7 is a top view of the cutting tool shown in FIG. 1, with a clamping screw removed.

As shown in FIGS. 1, 2 and 7, whilst the lower surface 34 of the cutting insert 30 is clamped against the seating surface 60 of the insert receiving pocket 26, the peripheral side surface 36 of the cutting insert 30 may be simultaneously clamped against the abutment shoulder 84 of the insert receiving pocket 26 solely by:

each of the two relief surfaces 42 located furthest from the operative corner cutting edge 44 making contact with a different one of the two abutment walls 86.

Further, in some embodiments of the present invention, as shown in FIG. 7, the vertical insert and pocket bisector planes P2, P3 may be coplanar.

What is claimed is:

1. A single-sided, square-shaped indexable cutting insert (30) comprising:
opposing square-shaped upper and lower surfaces (32, 34) and a peripheral side surface (36) extending therebetween, the peripheral side surface (36) having four corner surfaces (40) alternating with four relief surfaces (42);
a central axis (A1) passing through the upper and lower surfaces (32, 34), about which central axis the cutting insert (30) is indexable; and
a corner cutting edge (44) formed at the intersection of the upper surface (32) with each of the four corner surfaces (40),
the lower surface (34) comprising:
a base surface (46); and
exactly four engagement ridges (50) protruding from the base surface (46), each engagement ridge (50) intersecting one of the four corner surfaces (40) and extending therefrom towards the central axis (A1) to thereby divide the base surface (46) into at least four base sub-surfaces (56), each engagement ridge (50) including a pair of parallely extending ridge flank surfaces (54) forming a V-shaped cross-section; and
further comprising:
a central boss (48) surface protruding from the base surface (46) and having a raised boss end surface (52), each engagement ridge (50) intersecting the central boss (48) to thereby separate the base sub-surfaces (56) from one another.

2. The cutting insert (20) according to claim 1, wherein:
the base surface (46) defines a base plane (P1);
the central boss (48) protrudes a first distance D1 from the base plane (P1) and the four engagement ridges (50) each protrude a second distance D2 from the base plane (P1); and
wherein D1 is equal to D2.

3. The cutting insert (30) according to claim 2, wherein each engagement ridge (50) includes an intermediate surface (58) spacing apart its respective pair of ridge flank surfaces (54), and wherein the boss end surface (52) and the four intermediate surfaces (58) are coplanar and continuous.

4. The cutting insert (30) according to claim 3, wherein each intermediate surface (58) has an intermediate width W, and wherein W is greater than half of D2 and less than D2.

5. The cutting insert (30) according to claim 1, wherein a through bore (76) extends coaxially with the central axis (A1) and opens out to both the upper surface (32) and the boss end surface (52).

6. The cutting insert (30) according to claim 1, wherein in a bottom view of the cutting insert (30), the central boss (48) has a substantially circular shape.

7. The cutting insert (30) according to claim 1, wherein each pair of ridge flank surfaces (54) intersects its respective corner surface (40).

8. The cutting insert (30) according to claim 1, wherein the four corner surfaces (40) are identical, and the four corner cutting edges (44) are identical.

9. The cutting insert (30) according to claim 1, wherein the cutting insert (30) exhibits four-fold rotational symmetry about the central axis (A1).

10. The cutting insert (30) according to claim 1, wherein a vertical insert plane (P2) contains the central axis (A1) and bisects two of the four corner cutting edges (44), and wherein the cutting insert (30) exhibits mirror symmetry about the vertical insert plane (P2).

11. The cutting insert (30) according to claim 1, wherein the base surface (46) comprises exactly four identical base sub-surfaces (56).

12. The cutting insert (30) according to claim 1, wherein the pair of ridge flank surfaces (54) of each engagement ridge (50) form an obtuse engagement angle ($\alpha$).

13. A cutting tool (20) comprising a tool holder (22) having a main body (24) with an insert receiving pocket (26) formed in a front end (28) thereof, and a cutting insert (30) in accordance with claim 1 removably secured in the insert receiving pocket (26).

14. The cutting tool (20) according to claim 13, wherein:
the insert receiving pocket (26) comprises:
a seating surface (60) having a floor surface (62) with a single engagement groove (64) recessed therein and two separate support pads (66) protruding therefrom;
the engagement groove (64) including a pair of parallelly extending groove flank surfaces (68) forming a V-shaped cross-section, and each of the two support pads (66) having a raised support surface (70), wherein the two support surfaces (70) are coplanar, and
the lower surface (34) of the cutting insert (30) is clamped against the seating surface (60) of the insert receiving pocket (26) solely by:
the pair of ridge flank surfaces (54) of the engagement ridge (50) located closest to the operative corner cutting edge (44) making contact with the corresponding pair of groove flank surfaces (68) in the single engagement groove (64); and
the base surface (46) making contact with the two raised support surfaces (70) at two bearing zones (72) entirely located further from the operative corner cutting edge (44) than the central axis (A1).

15. The cutting tool (20) according to claim 14, wherein the insert receiving pocket (26) includes an abutment shoulder (84) rearward of the seating surface (60) having exactly two abutment walls (86), and wherein the peripheral side surface (36) of the cutting insert (30) is clamped against the abutment shoulder (84) of the insert receiving pocket (26) solely by:
each of the two relief surfaces (42) located furthest from the operative corner cutting edge (44) making contact with a different one of the two abutment walls (86).

16. The cutting tool (20) according to claim 14, wherein the lower surface (34) of the cutting insert (30) is clamped against the seating surface (60) of the insert receiving pocket (26) in one of four index positions.

17. The cutting tool (20) according to claim 14, wherein the cutting insert (30) exhibits four-fold rotational symmetry about the central axis (A1).

18. The cutting tool (20) according to claim 14, wherein the two bearing zones (72) are each delimited by a different one of the two relief surfaces (42) located furthest from the operative corner cutting edge (44).

19. The cutting tool (20) according to claim 14, wherein a central boss (48) having a raised boss end surface (52) protrudes from the base surface (46), and each engagement ridge (50) intersects the central boss (48) to thereby separate the sub-surfaces (56) from one another, and wherein the two bearing zones (72) are located on two of the at least four base sub-surfaces (56).

20. The cutting tool (20) according to claim 19, wherein:
the base surface (46) defines a base plane (P1);
the central boss (48) protrudes a first distance D1 from the base plane (P1) and the four engagement ridges (50) each protrude a second distance D2 from the base plane (P1); and
wherein D1 is equal to D2.

21. The cutting tool (20) according to claim 19, wherein the floor surface (62) has a central recess (74), and
wherein the central recess (74) provides clearance between the central boss (48) and the insert receiving pocket (26).

22. The cutting tool (20) according to claim 19, wherein:
each engagement ridge (50) includes an intermediate surface (58) spacing apart its respective pair of ridge flank surfaces (54);
the boss end surface (52) and the four intermediate surfaces (58) are coplanar and continuous; and
wherein the intermediate surface (58) of the engagement ridge (50) located closest to the operative corner cutting edge (44) does not abut any surface of the engagement groove (64).

23. The cutting tool (20) according to claim 19, wherein:
a through bore (76) extends coaxially with the central axis (A1) and opens out to both the upper surface (32) and the boss end surface (52); and
a clamping screw (78) located in the through bore (76) is threadingly engaged in a threaded bore (80) in the seating surface (60).

24. The cutting tool (20) according to claim 23, wherein the through bore (76) and the threaded bore (80) are eccentric to each other.

25. A cutting tool (20) comprising a tool holder (22) having a main body (24) with an insert receiving pocket (26) formed in a front end (28) thereof, and a single-sided square-shaped indexable cutting insert (30) removably secured in the insert receiving pocket (26);
the insert receiving pocket (26) comprising:
a seating surface (60) having a floor surface (62) with a single engagement groove (64) recessed therein and two separate support pads (66) protruding therefrom;
the engagement groove (64) including a pair of parallely extending groove flank surfaces (68) forming a V-shaped cross-section, and each of the two support pads (66) having a raised support surface (70),
wherein the two support surfaces (70) are coplanar, and the cutting insert (30) comprising:
opposing square-shaped upper and lower surfaces (32, 34) and a peripheral side surface (36) extending therebetween, the peripheral side surface (36) having four corner surfaces (40) alternating with four relief surfaces (42);
a central axis (A1) passing through the upper and lower surfaces (32, 34), about which central axis the cutting insert (30) is indexable; and
a corner cutting edge (44) formed at the intersection of the upper surface (32) with each of the four corner surfaces (40),
the lower surface (34) including a base surface (46) and having exactly four engagement ridges (50) protruding from the base surface (46),
wherein each engagement ridge (50) includes a pair of parallely extending ridge flank surfaces (54) forming a V-shaped cross-section, and each engagement ridge (50) intersects one of the four corner surfaces (40) and extends therefrom towards the central axis (A1),
wherein the lower surface (34) of the cutting insert (30) is clamped against the seating surface (60) of the insert receiving pocket (26) solely by:
the pair of ridge flank surfaces (54) of the engagement ridge (50) located closest to the operative corner cutting edge (44) making contact with the corresponding pair of groove flank surfaces (68) in the single engagement groove (64); and
the base surface (46) making contact with the two raised support surfaces (70) at two bearing zones (72) entirely located further from the operative corner cutting edge (44) than the central axis (A1).

\* \* \* \* \*